(12) United States Patent
Choi (10) Patent No.: US 10,000,169 B2
(45) Date of Patent: Jun. 19, 2018

(54) POWER CONTROL APPARATUS, VEHICLE HAVING THE SAME, AND METHOD OF CONTROLLING VEHICLE

(71) Applicants: Hyundai Motor Company, Seoul (KR); Kia Motors Corporation, Seoul (KR)

(72) Inventor: Kee Hoon Choi, Gyeonggi-do (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 279 days.

(21) Appl. No.: 14/958,464

(22) Filed: Dec. 3, 2015

(65) Prior Publication Data

US 2017/0101068 A1    Apr. 13, 2017

(30) Foreign Application Priority Data

Oct. 13, 2015  (KR) .................. 10-2015-0142924

(51) Int. Cl.
  *B60L 1/00*   (2006.01)
  *B60R 16/033* (2006.01)
(52) U.S. Cl.
  CPC ................. *B60R 16/033* (2013.01)
(58) Field of Classification Search
  CPC ................................................. B60R 16/033

USPC ..... 307/10.1, 9.1, 10.6, 10.7, 10.8; 320/103, 320/104
See application file for complete search history.

(56) References Cited

U.S. PATENT DOCUMENTS

| | | | | |
|---|---|---|---|---|
| 2005/0029871 A1* | 2/2005 | Mori | ...................... | B60R 25/00 307/10.3 |
| 2007/0110360 A1* | 5/2007 | Stanford | ................. | H04L 12/10 385/14 |
| 2007/0241614 A1* | 10/2007 | Busdiecker | ............... | H02J 1/14 307/10.1 |

FOREIGN PATENT DOCUMENTS

| | | |
|---|---|---|
| JP | 2003-291753 A | 10/2003 |
| JP | 2011-105205 A | 6/2011 |
| JP | 2013-192108 A | 9/2013 |

* cited by examiner

*Primary Examiner* — Thomas Skibinski
(74) *Attorney, Agent, or Firm* — Mintz Levin Cohn Ferris Glovsky and Popeo, P.C.; Peter F. Corless

(57) ABSTRACT

A power control apparatus, a vehicle having the same, and a method of controlling the vehicle are provided. The power control apparatus includes a communication unit that is configured to receive a request message related to a power setting via a communication network in a vehicle and a determination unit that is configured to determine a power condition based on the request message related to the power setting. Additionally, an application controller is configured to execute an application of power supplied from at least one among a battery and an alternator power supply based on a result of the determination.

18 Claims, 11 Drawing Sheets

| REQUIRED ELECTRIC POTENTIAL | CAN Signal Name | ELECTRIC POTENTIAL SETTING | | | COMMUNICATION CODE (4 bits) | | | | RESULT VALUE |
|---|---|---|---|---|---|---|---|---|---|
| | | UNIT A (1000) | UNIT B (1001) | UNIT C (1010) | | | | | |
| (1) +12.0V | Power_120V | | | 0 | 1 | 0 | 0 | 0 | C = +12V |
| (2) +7.5V | Power_75V | | | | 0 | 1 | 0 | 0 | Not used |
| (3) +5.0V | Power_50V | 0 | | | 0 | 0 | 1 | 0 | A = +5V |
| (4) +3.3V | Power_33V | | 0 | | 0 | 1 | 0 | 1 | B = +3.3V |

FIG. 7B

| REQUIRED ELECTRIC POTENTIAL | | CAN Signal Name | ELECTRIC POTENTIAL SETTING | | | COMMUNICATION CODE (4 bits) | | | | RESULT VALUE |
|---|---|---|---|---|---|---|---|---|---|---|
| | | | UNIT A (1000) | UNIT B (1001) | UNIT C (1010) | | | | | |
| (1) | + 12.0V | Power_120V | | 0 | | 1 | 0 | 0 | 0 | B = + 12V |
| (2) | + 7.5V | Power_75V | | | 0 | 0 | 1 | 0 | 0 | C = + 7.5V |
| (3) | + 5.0V | Power_50V | | | | 0 | 0 | 1 | 0 | Not used |
| (4) | + 3.3V | Power_33V | 0 | | | 0 | 1 | 0 | 1 | A = + 3.3V |

FIG. 9

POWER CONTROL APPARATUS, VEHICLE HAVING THE SAME, AND METHOD OF CONTROLLING VEHICLE

CROSS-REFERENCE TO RELATED APPLICATION

This application claims the benefit of Korean Patent Application No. 10-2015-0142924, filed on Oct. 13, 2015 in the Korean Intellectual Property Office, the disclosure of which is incorporated herein by reference.

BACKGROUND

1. Field of the Invention

The present invention relates to a power control apparatus to adjust power supplied to a device within a vehicle, a vehicle having the same, and a method of controlling the vehicle.

2. Description of the Related Art

Recently, vehicles are being mounted with various devices installed therein. For example, the vehicles include not only devices required for driving of vehicles, such as a steering wheel and an engine, but also various devices that improve user convenience, such as an audio video navigation (AVN) terminal, an external amplifier, a compact disc (CD) deck, a display, and a telematics unit (TMU). The AVN terminal, the external amplifier, the CD deck, the display, and the TMU may have the same or different ratings. Therefore, to correspond the ratings to each other, stabilizing circuits are individually installed in the various devices mounted within the vehicle.

SUMMARY

Additional aspects of the invention will be set forth in part in the description which follows and, in part, will be obvious from the description, or may be learned by practice of the invention.

In accordance with one aspect of the present invention, a power control apparatus may include a communication unit configured to receive a request message related to a power setting via a communication network in a vehicle, a determination unit configured to determine a power condition based on the request message related to the power setting, and an application controller configured to execute an application of power supplied from at least one among a battery and an alternator power supply based on a result of the determination.

The communication unit may be configured to receive the request message related to the power setting from at least one device within the vehicle via a controller area network (CAN). The determination unit may be configured to determine the power condition using a communication code included in the request message related to the power setting. Additionally, the determination unit may be configured to determine whether the power condition corresponds to at least one power condition among Ignition 1 (IGN1), Ignition 2 (IGN2), Accessory (ACC), Start (ST), B+, and off (OFF) using the communication code included in the request message related to the power setting.

The application controller may be configured to regulate the power supplied from the battery and the alternator power supply into power that corresponds to the at least one power condition among IGN1, IGN2, ACC, ST, B+, and OFF and apply the regulated power based on the result of the determination. The application controller may also be configured to, when the power condition is determined to be changed, execute an application of the power to power that corresponds to the changed power condition in response to the application of power based on the result of the determination.

In accordance with another aspect of the present invention, a vehicle may include a communication unit configured to receive a request message related to a power setting via a communication network in the vehicle, a determination unit configured to determine a power condition based on the request message related to the power setting, and an application controller configured to execute an application of power, supplied from at least one among a battery and an alternator power supply, based on a result of the determination.

The communication unit may be configured to receive the request message related to the power setting from at least one device within the vehicle via a controller area network (CAN). The determination unit may be configured to determine the power condition using a communication code included in the request message related to the power setting. Additionally, the determination unit may be configured to determine whether the power condition corresponds to at least one power condition among Ignition 1(IGN1), Ignition 2 (IGN2), Accessory (ACC), Start (ST), B+, and off (OFF) using the communication code included in the request message related to the power setting.

The application controller may be configured to regulate the power, supplied from the battery and the alternator power supply, into power that corresponds to at least one among the IGN1, the IGN2, the ACC, the ST, the B+, and the OFF and apply the regulated power based on the result of the determination. The application controller may also be configured to, when the power condition is determined to be changed, execute an application to the power to power that corresponds to the changed power condition in response to that the application of power based on the result of the determination.

In accordance with another aspect of the present invention, a method of controlling a vehicle may include receiving a request message related to a power setting via a communication network in the vehicle, determining a power condition based on the request message related to the power setting, and executing application of power supplied form at least one among a battery and an alternator power supply based on a result of the determination.

The receiving of the request message may include receiving a request message related to the power setting from at least one device within the vehicle via a controller area network (CAN). The determination of a power condition may include determining the power condition using a communication code included in the request message related to the power setting. Additionally, the determination of the power condition may include determining whether the power condition corresponds to at least one power condition among Ignition 1 (IGN1), Ignition 2(IGN2), Accessory (ACC), Start (ST), B+, and off (OFF) using the communication code included in the request message related to the power setting.

The execution of the application power may include regulating the power, supplied from the battery and the alternator power supply, into power that corresponds to at least one among the IGN1, the IGN2, the ACC, the ST, the B+, and the OFF, and applying the regulated power based on the result of the determination. The supplying of power may include, when the power condition is determined to be changed, executing an application of the power to power that corresponds to the changed power condition in response to the application of power based on the result of the determination.

BRIEF DESCRIPTION OF THE DRAWINGS

These and/or other aspects of the invention will become apparent and more readily appreciated from the following description of the embodiments, taken in conjunction with the accompanying drawings of which.

DETAILED DESCRIPTION

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

Furthermore, control logic of the present invention may be embodied as non-transitory computer readable media on a computer readable medium containing executable program instructions executed by a processor, controller/control unit or the like. Examples of the computer readable mediums include, but are not limited to, ROM, RAM, compact disc (CD)-ROMs, magnetic tapes, floppy disks, flash drives, smart cards and optical data storage devices. The computer readable recording medium can also be distributed in network coupled computer systems so that the computer readable media is stored and executed in a distributed fashion, e.g., by a telematics server or a Controller Area Network (CAN).

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Hereafter, exemplary embodiments of the present invention will be described in detail with reference to the attached drawings.

Figure 1:
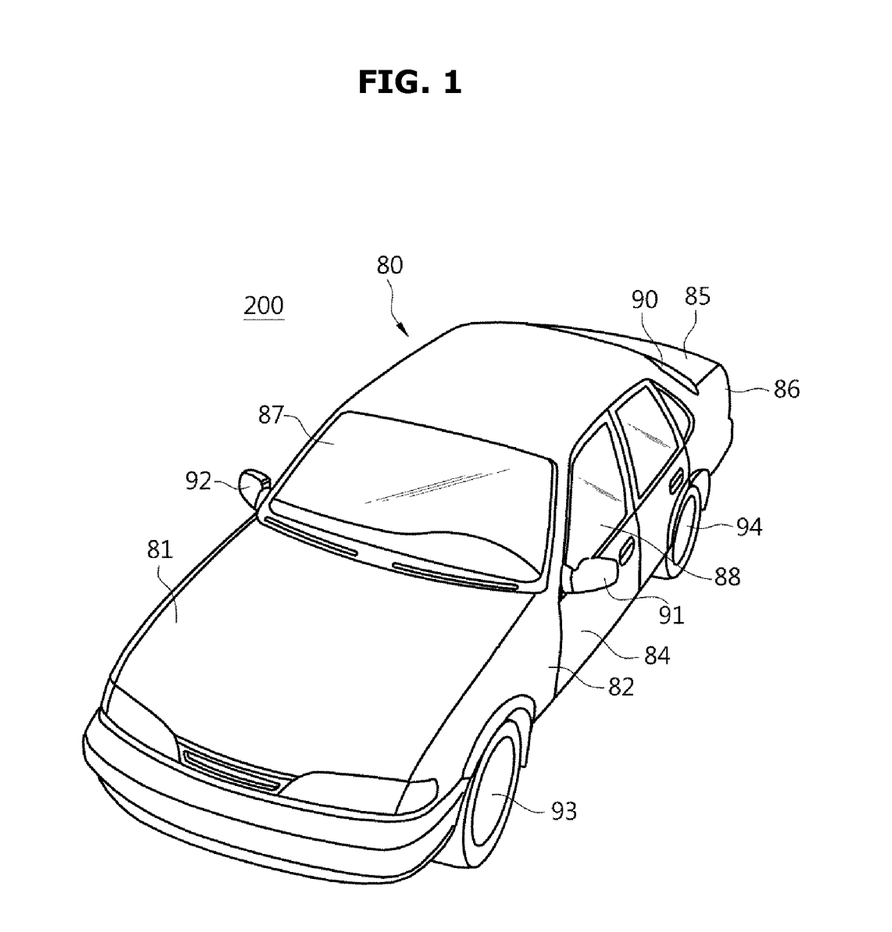
FIG. 1 is a view schematically illustrating an external configuration of a vehicle according to an exemplary embodiment of the present invention.

FIG. 1 is a view schematically illustrating an external configuration of a vehicle according to an exemplary embodiment of the present invention. Referring to FIG. 1, a vehicle 200 may include a vehicle body 80 to form an appearance of the vehicle 200, and vehicle wheels 93 and 94 configured to move the vehicle 200. The vehicle body 80 may include a hood 81, a front fender 82, doors 84, a trunk lid 85, a quarter panel 86, and the like.

Additionally, a front window 87 may be installed at a front side of the vehicle body 80 to provide view in front of the vehicle 200, a side window 88 may provide a view to a side, and side mirrors 91 and 92 may be installed in the doors 84 to provide a view to a rear and the side of the vehicle 200, and a rear window 90 may be installed at a rear side of the vehicle body 80 to provide a view to the rear of the vehicle 200. Hereafter, an internal configuration of the vehicle 200 will be described in detail.

Figure 2:
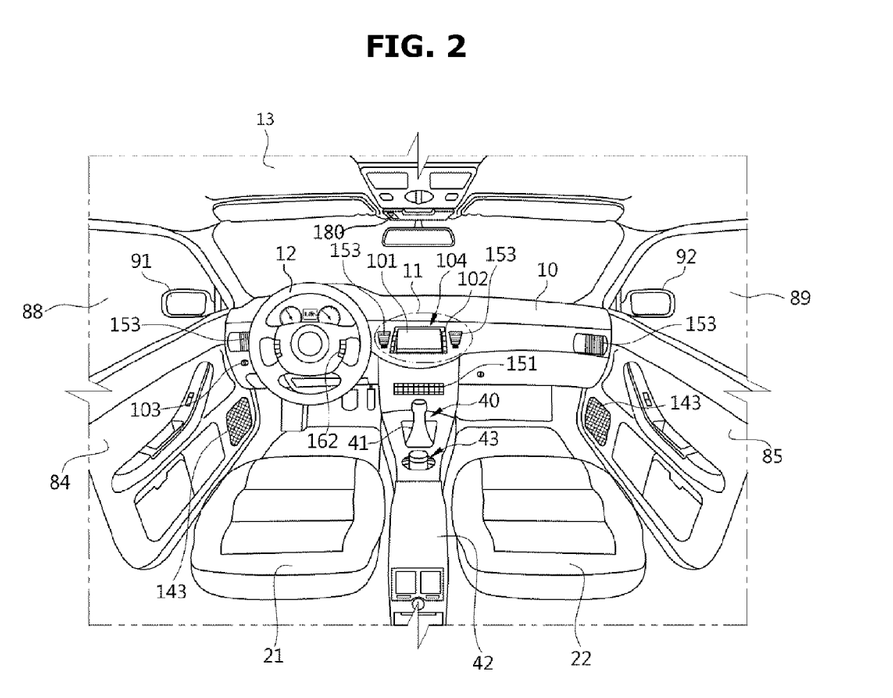
FIG. 2 is a view illustrating an internal configuration of the vehicle according to the exemplary embodiment of the present invention.

FIG. 2 is a view illustrating an internal configuration of the vehicle according to the exemplary embodiment of the present invention. An audio video navigation terminal (AVN) 104 may be indisposed within the vehicle. The AVN terminal 104 refers to a terminal that may provide a navigation function to provide a route toward a destination for a user and audio and video functions. For example, referring to FIG. 2, the AVN terminal 104 may be configured to selectively display at least one among an audio screen, a video screen, and a navigation screen through a display 101, and may be configured to display various control screens related to operation of the vehicle 200 or a screen related to an additional function that may be performed in the AVN terminal 104.

According to the exemplary embodiment of the present invention, the AVN terminal 104 may be configured to display various control screens related to operation of an air conditioning device through the display 101 by linking with the air conditioning device. Additionally, the AVN terminal 104 may be configured to adjust air conditioning environment within the vehicle by adjusting an operation condition of the air conditioning device. Meanwhile, the display 101 may be positioned at a center fascia 11 which is a central area of a dashboard 10. According to the exemplary embodiment of the present invention, the display 101 may be implemented as a liquid crystal display (LCD), a light emitting diode (LED), a plasma display panel (PDP), an organic light emitting diode (OLED), a cathode ray tube (CRT), and the like, but is not limited thereto.

Furthermore, a speaker 143 configured to output sound may be disposed within the vehicle 200. Therefore, the vehicle 200 may be configured to output sound required for an audio function, a video function, a navigation function, and other additional functions through the speaker 143. A navigation input unit 102 may be positioned at the center fascia 11 which is a central area of the dashboard 10. A driver may input various control commands by operating the navigation input unit 102. In addition, the navigation input unit 102 may be disposed in an area near the display 101 as a hard key type. Meanwhile, when the display 101 is implemented as a touch screen type, the display 101 may also be configured to perform a function of the navigation input unit 102. Since the air conditioning device may be disposed within the vehicle 200, the air conditioning device may be configured to perform both heating and cooling, and adjust an inner temperature of the vehicle 200 by discharging heated or cooled air through a vent 153.

According to the exemplary embodiment of the present invention, the air conditioning device may correspond to a dual-zone automatic temperature controller (DATC). The DATC refers to an automatic temperature control device configured to set temperature and the like of each of a driver seat 21 and a passenger seat 22 automatically or according to a control command of a user. The vehicle 200 may improve convenience for passengers by individually adjusting an air conditioning environment for each of the driver seat 21 and the passenger seat 22, on which a fellow passenger is seated, using the DATC.

According to the exemplary embodiment of the present invention, the air conditioning device may be configured to adjust an air conditioning environment appropriate for an environment of the users seated on the driver seat 21 and passenger seat 22 by discharging air appropriate for each of the users seated on the driver seat 21 and passenger seat 22 through the vent 153. Additionally, the air conditioning device may be configured to individually adjust the air conditioning environment of seats on which other passengers are seated other than the driver seat 21 and the passenger seat 22.

Meanwhile, to operate the devices within the vehicle such as the above-described air conditioning device, the display 101, the navigation input unit 102, the AVN terminal 104, a voice input unit 190, and the speaker 143 appropriate power should be supplied to a corresponding device. As shown in FIG. 2, a key home 103 into which an ignition key (IGN key) is inserted may be disposed within the vehicle. The key home 103, as shown in FIG. 2, may be disposed on a left side of the steering wheel, but is not limited thereto. The key home 103 may be positioned on a right side of the steering wheel. An ignition key to be described below refers to a key for starting an engine of the vehicle. For example, the ignition key may be implemented in a general key form.

Figure 3:
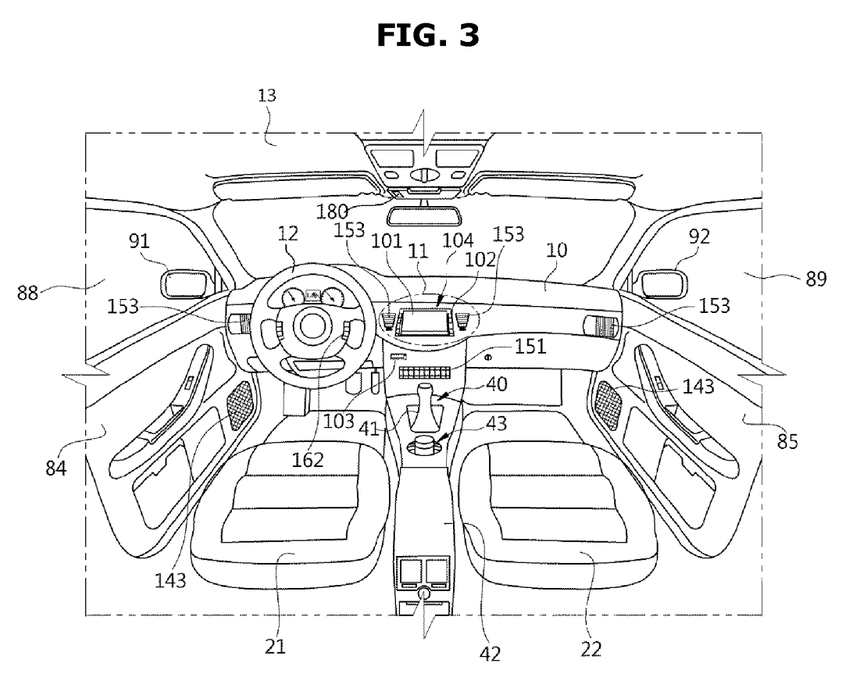
FIG. 3 is a view illustrating an internal configuration of a vehicle according to another exemplary embodiment of the present invention.

Based on where the ignition key is positioned after the user inserts the ignition key into the key home 103 and turns the ignition key, a magnitude of power supplied to the vehicle may be different. In other words, the power supplied to the vehicle may be set differently based on the position of the ignition key. Additionally, power regularly supplied regardless of the position of the ignition key may be present, but is not limited thereto. In addition, the ignition key may be implemented in a smart key form. As shown in FIG. 3, the key home 103 into which the smart key is inserted may be indisposed within the vehicle. For example, when the smart key is detected within the vehicle, the user inserts the smart key, or, although not shown in the drawings, presses (e.g., engages) an engine starting button (start button) the power supplied to the vehicle may be different.

A power condition to be described below, which is a rating required to operate devices, refers to an output, a voltage, a current, and the like required to operate the devices. Since the vehicle includes various devices, it is necessary to operate all of the devices within the vehicle or only a part of the devices in the vehicle under a specific situation by unifying the power condition to a certain extent. Therefore, ratings such as a power and a current may be the same or different based on the power condition.

According to the exemplary embodiment of the present invention, the power condition may be classified into Ignition 1(IGN 1), Ignition 2(IGN 2), Accessory (ACC), Battery+ (B+), Start (ST), and off (OFF). The IGN1 refers to a power condition required to start the engine and operate the vehicle. For example, the IGN1 corresponds to the power condition for operating the engine, an automatic transmission, a brake, and the like. Additionally, the IGN2 refers to a power condition of devices concomitantly required to operate the vehicle. For example, the IGN2 corresponds to a power condition of a wiper, the air conditioning device, a sunroof, and the like.

The ACC refers to a power condition of the devices installed for convenience of the passengers. For example, the ACC corresponds to the power condition of an audio, a cigar lighter, and the like. The ST refers to a power condition for starting the engine of the vehicle. In addition, the B+, which is normal power, refers to power supplied regardless of the position of the ignition key. For example, devices such as an indoor light, operated regardless of the position of the ignition key, correspond to a power condition of the B+. The magnitude of voltage and current corresponding to each of the power conditions may be different.

The devices within the vehicle may have the same power condition or different power conditions. For example, when the user inserts the ignition key into the key home 103 and turns the ignition key to the position of the ACC, the AVN terminal 104 and the audio may be operated through power supply, but the air conditioning device and a heating wire of the steering wheel may not be operated due to inappropriate power supply. As an another example, when the user starts the engine by turning the ignition key, the air conditioning device and the heating wire of the steering wheel as well as the AVN terminal 104 and the audio may be operated.

Hereafter, an inner configuration of the power control apparatus to supply power appropriate for the various devices installed within the vehicle will be described in detail.

Figure 4:
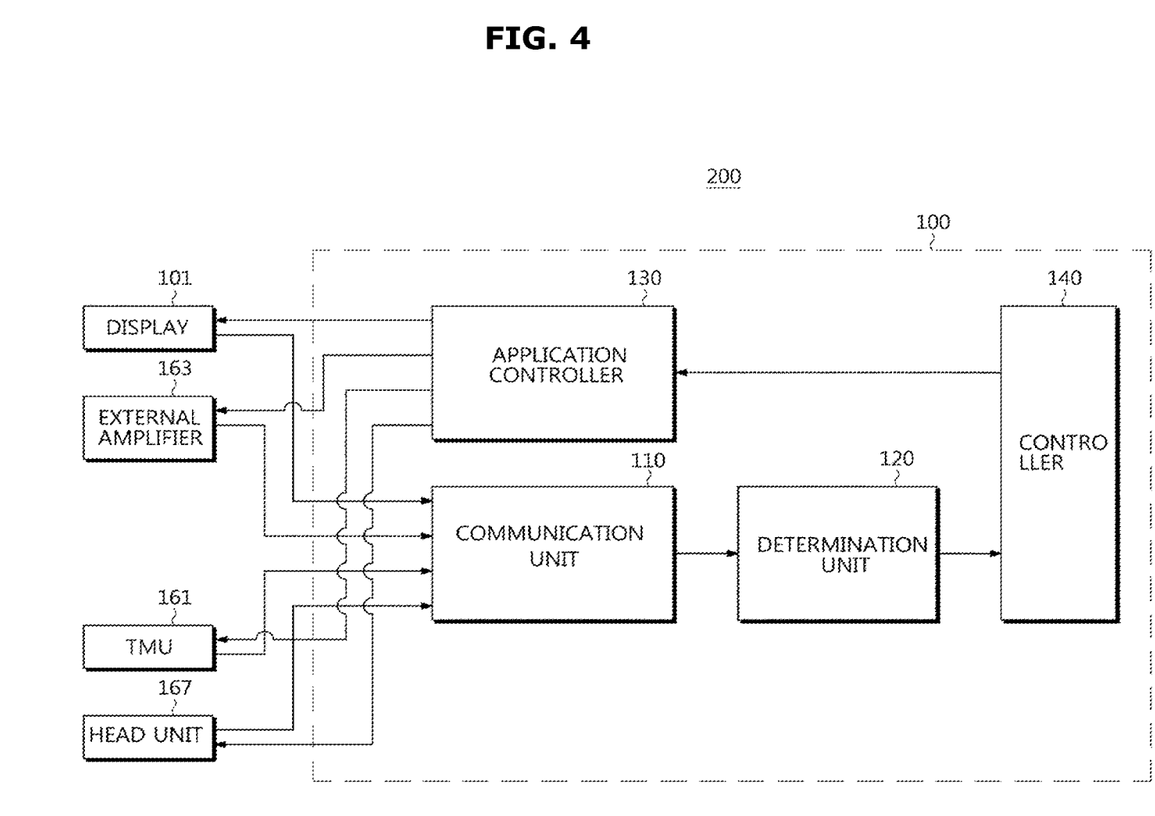
FIG. 4 is a block diagram illustrating the vehicle including a power control apparatus according to the exemplary embodiment of the present invention.

FIG. 4 is a block diagram illustrating the vehicle including a power control apparatus according to the exemplary embodiment of the present invention. Referring to FIG. 4, the vehicle 200 may include a power control apparatus 100, having a communication unit 110, a determination unit 120, an application controller 130, a controller 140, a display 101, a telematics unit (TMU) 161, an external amplifier 163, a head unit 167, and the like. The controller 140 may be an upper controller configured to operate the other various components and units of the power control apparatus 100.

The communication unit 110, the determination unit 120, the application controller 130, and the controller 140 may be integrated in a system on chip (SOC) embedded in the power control apparatus 100. Meanwhile, the power control apparatus 100 may be positioned anywhere within the vehicle 200. According to the exemplary embodiment of the present invention, the power control apparatus 100 may be independently positioned in the vehicle 200 and may be positioned in the AVN terminal, but is not limited thereto.

The communication unit 110 may be configured to transceive various data with the various devices in the vehicle 200 via a communication network within the vehicle. The various devices within the vehicle 200 may include all devices operated by receiving power from the power control apparatus 100. For example, the devices may include the display 101, the TMU 161, the external amplifier 163, and the head unit 167 as well as all devices installed within the vehicle 200 shown in FIG. 1 such as a center input unit 43 and a voice input unit 180, but is not limited thereto. The communication network in the vehicle refers to a communication network capable of transceiving data between the devices in the vehicle 200. According to the exemplary embodiment of the present invention, the communication unit 110 may be configured to transmit and receive data to and from the devices in the vehicle 200 via a controller area network (CAN).

A CAN to be described below, which is a network for the vehicle to provide digital serial communications between various control devices of the vehicle 200, refers to a communication network for providing real-time communications by replacing complex electric wiring in an electronic component in the vehicle 200 and a relay with a serial communication line. However, the communication network in the vehicle is not limited to the exemplary embodiment of the present invention, and the communication unit 110 may be configured to transceive data with the devices within the vehicle 200 through various communication networks usable in the vehicle 200.

According to the exemplary embodiment of the present invention, the communication unit 110 may be configured to receive a request message related to a power setting from the various devices within the vehicle via the CAN. The request message related to the power setting refers to a message including information regarding a rating required for operation of the devices. The rating refers to an output, a voltage, a current, and the like required to operate the devices. Ratings of devices in the vehicle 200 may be the same or may be different. Therefore, between request messages that the communication unit 110 receives from the devices in the vehicle 200, information requesting same ratings may be included or information requesting ratings different from each other may be included.

The devices may be configured to request power supply by sending or transmitting a request message related to a power setting via the CAN. For example, the devices may be configured to transfer a message for requesting power supply via the CAN in response to a changed position of the ignition key or an operation request of the user. An identification code which distinguishes devices as well as a communication code may be included in the request message related to the power setting. The communication code may include data regarding a power condition that the devices request. For example, the communication code may be formed of an M (M≥1) number of bits. The determination unit 120 may be configured to determine a power condition of a corresponding device using the communication code of M bits included in a request message received from the devices.

In particular, a power condition to be described below refers to a rating required to operate the devices. Information regarding the communication code of M bits and the rating corresponding to the communication code may be preset between the device and the power control apparatus 100, and may be stored in a memory in the vehicle 200. According to the exemplary embodiment of the present invention, at least one among an electric potential of n (n>0) V and a current of m (m>0) A may be required to operate the display 101. Therefore, a power condition of the display 101 may include at least one among n V and m A.

The determination unit 120 may be configured to determine a power condition using the communication code included in the request message related to the power setting. The devices within the vehicle 200 may be operated by receiving power that corresponds to each power condition. For example, the display 101, the TMU 161, the external amplifier 163, and the head unit 167 that are illustrated in FIG. 4 may be operated only when power that corresponds to each power condition is supplied. In particular, since the various devices are installed within the vehicle 200, it is necessary to operate only a specific device under a specific situation or operate all devices in the vehicle 200 under other situations by unifying the power condition to a certain extent. Therefore, the power condition may be classified into the IGN1, the IGN2, the ACC, the B+, the ST, and the OFF. Since descriptions about each power condition are the same as described above, the descriptions will be omitted.

Meanwhile, the determination unit 120 may be configured to distinguish a device that sends or transmits the request message using the identification code included in the request message related to the power setting. For example, the device that corresponds to the identification code may be preset among the devices installed in the power control apparatus 100 and the vehicle 200. The information regarding the device that corresponds to the identification code may be preset and may be stored in a memory of the power control apparatus 100.

The memory, which is a device to store data, may be configured to store various data. According to the exemplary embodiment of the present invention, the memory may be in the form of a random access memory (RAM), a read-only memory (ROM), and a flash memory as well as a card-shaped memory card such as a secure digital (SD) card, a solid state drive (SSD) card. The memory is not limited to the exemplary embodiment of the present invention and includes all devices capable of storing data.

As a specific example, when the identification code included in the request message related to the power setting is '1011', the determination unit 120 may be configured to distinguish that the device that corresponds to the identification code is the display 101. When the communication code included in the request message related to the power setting is '1101', the determination unit 120 may be configured to determine that an electric potential that corresponds to the communication code is '12 V'.

Further, the application controller 130 may be configured to execute an application of power appropriate to each of the devices in the vehicle 200 based on the communication code. According to the exemplary embodiment of the present invention, the application controller 130 may be configured to perform a regulating process to stabilize power supplied from at least one among a battery and an alternator power supply by adjusting a voltage to be appropriate for a working voltage required by the devices. Therefore, the application controller 130 may be configured to execute the application of power converted to be appropriate for the devices in the vehicle 200.

As a specific example, a power supplied from at least one among the battery and the alternator power supply may be about 9 to 16 V, and may be unstable. Therefore, the application controller 130, as a specific example, may be configured to perform a regulating process to uniformly stabilize the power supplied from at least one among the battery and the alternator power supply by reducing the voltage down to the working voltage that the devices in the vehicle 200 require. Meanwhile, since the battery and the alternator power supply are connected in parallel, the application controller 130 may be configured to receive power from the alternator power supply even when the battery is discharged. Additionally, although the alternator power supply is blocked, the application controller 130 may be configured to receive power from the battery.

According to the exemplary embodiment of the present invention, the application controller 130 may include a power stabilizing circuit. The power stabilizing circuit may be configured to stabilize the power supplied from at least one among the battery and the alternator power supply. Specifically, since a voltage of the power supplied from the alternator power supply is unstable, the application controller 130 may be configured to perform a regulating process to stabilize the voltage by reducing the voltage to be appropriate for the working voltage that the devices within the vehicle 200 require.

For example, a voltage of a power supplied from the alternator power supply may be about 9 to 16 V, and may be unstable. For example, the power stabilizing circuit may be configured to stabilize the voltage to a voltage between 12 to 14 V. Therefore, the application controller 130 may be configured to execute an application of the stabilized power to the devices within the vehicle using a switching circuit. The application controller 130 may then be configured to individually apply a power condition required by the devices within the vehicle 200, that is, the power stabilized to be appropriate for the working voltage, using the switching circuit.

Since the power control apparatus 100 converts power to be appropriate for each device in the vehicle 200 and applies the power, it is not necessary for the power stabilizing circuit to be individually mounted in the devices within the vehicle 200. Therefore, the power control apparatus 100 may reduce material costs of the devices within the vehicle 200, and may reduce development costs and a development period by integrating power stabilizing circuits installed in the devices within the vehicle 200 into a single device and unifying power stabilizing circuit in an external form. The controller 140 may be a central processing unit of the power control apparatus 100, and more specifically, may be implemented as a microprocessor. A microprocessor to be described below refers to a processing unit including an arithmetic and a logic unit, a register, a program counter, a command decoder or a control circuit, and the like included in at least one silicon chip.

According to the exemplary embodiment of the present invention, the controller 140 may be configured to execute a general operation of the power control apparatus 100 and adjust a flow of signals of internal configuration elements of the power control apparatus 100, and may be configured to process data supplied thereto. The controller 140 may be configured to operate the application controller 130 to apply power to the devices within the vehicle based on a determination result according to the communication code. Meanwhile, the devices within the vehicle 200, such as the display 101, the TMU 161, the external amplifier 163, the head unit 167, may include a communication module configured to send and receive data to and from the communication unit 110. A communication module to be described below refers to a module configured to transmit data via a network in the vehicle. For example, the communication module may include a network manager. The network manager, as a firmware, refers to a software which operates to wake up the CAN in a sleep state and corresponds to an interaction layer on top of a physical layer.

Figure 5:
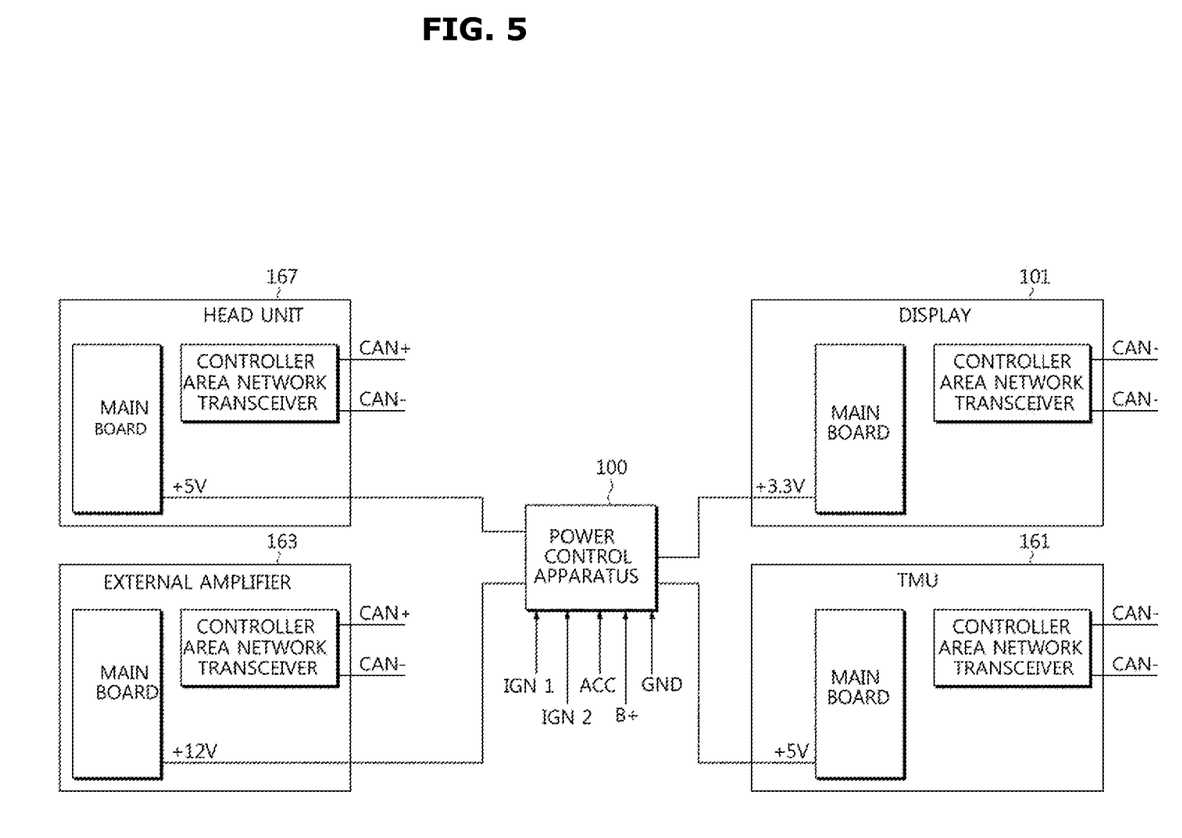
FIG. 5 is a view illustrating a relationship between the power control apparatus and various devices in the vehicle via a controller area network (CAN) according to the exemplary embodiment of the present invention.

According to the exemplary embodiment of the present invention, the devices of the vehicle 200 may wake up the CAN using the network manager. Therefore, the devices within the vehicle 200 may be configured to transmit the request massage, related to the power setting, via the woken-up CAN. FIG. 5 is a view illustrating a relationship between the power control apparatus and various devices within the vehicle via a CAN according to the exemplary embodiment of the present invention.

The various devices within the vehicle may include a communication module. The communication module refers to a module configured to control a connection with the network in the vehicle. A device which desires to receive power among the devices within the vehicle may attempt a connection with the network via the communication module. Therefore, the device may be configured to transmit a request message, related to the power setting to the power control apparatus 100 via the network.

The power control apparatus 100 may be configured to receive power based on various power conditions. Referring to FIG. 5, the power control apparatus 100 may be configured to receive power that corresponds to the power conditions of the IGN1, the IGN2, the ACC, the B+, the ST, and the OFF. For example, a voltage that corresponds to the IGN1 may be about 14 V, a voltage that corresponds to the IGN2 may be about 5 V, a voltage that corresponds to the ACC may be about 3.3 V, and a voltage that corresponds to OFF may be about 0 V. The power control apparatus 100 may be configured to supply power that corresponds to a power condition that the various devices within the vehicle request. For example, as shown in FIG. 5, the power control apparatus 100 may be configured to supply power to at least one among the display 101, the TMU 161, the external amplifier 163, and the head unit 167.

According to the exemplary embodiment of the present invention, when a request message related to a power setting is received from the display 101, the power control apparatus 100 may be configured to determine a power condition that the display 101 desires to receive based on a communication code included in the request message related to the power setting. Therefore, as shown in FIG. 5, the power control apparatus 100 may be configured to supply power of about 3.3 V to a main board of the display 101.

As another example, when a request message related to a power setting is received from the TMU 161, the power control apparatus 100 may be configured to determine a power condition that the TMU 161 desires to receive based on a communication code included in the request message related to the power setting. In response to determining that the power condition is OFF, the power control apparatus 100 may be configured to supply power of 0 V to a main board of the TMU 161. In other words, the power control apparatus 100 may be configured to block a supply of power to the main board of the TMU 161. Additionally, as shown in FIG. 5, the power control apparatus 100 may be configured to supply power of about 5 V to the main board of TMU 161 by determining the power condition. Further, as shown in FIG. 5, the power control apparatus 100 may be configured to supply power of about 12 V and 5 V to the external amplifier 163 and the head unit 167, respectively.

Meanwhile, the TMU 161 and the head unit 167 are not separately present in the vehicle, and may be integrated into a single device. The power control apparatus 100 may thus be configured o determine a power condition that a corresponding device desires to receive by receiving the request message related to the power setting from the device which the TMU 161 and the head unit 167 are integrated into, and may be configured to supply power that corresponds to the determination result. In other words, the device to supply power is not limited to the drawings, and the power control apparatus 100 may be configured to determine the power condition by receiving the request message related to the power setting from any device within the vehicle, and may be configured to supply power that corresponds to the determination result.

Figure 6:
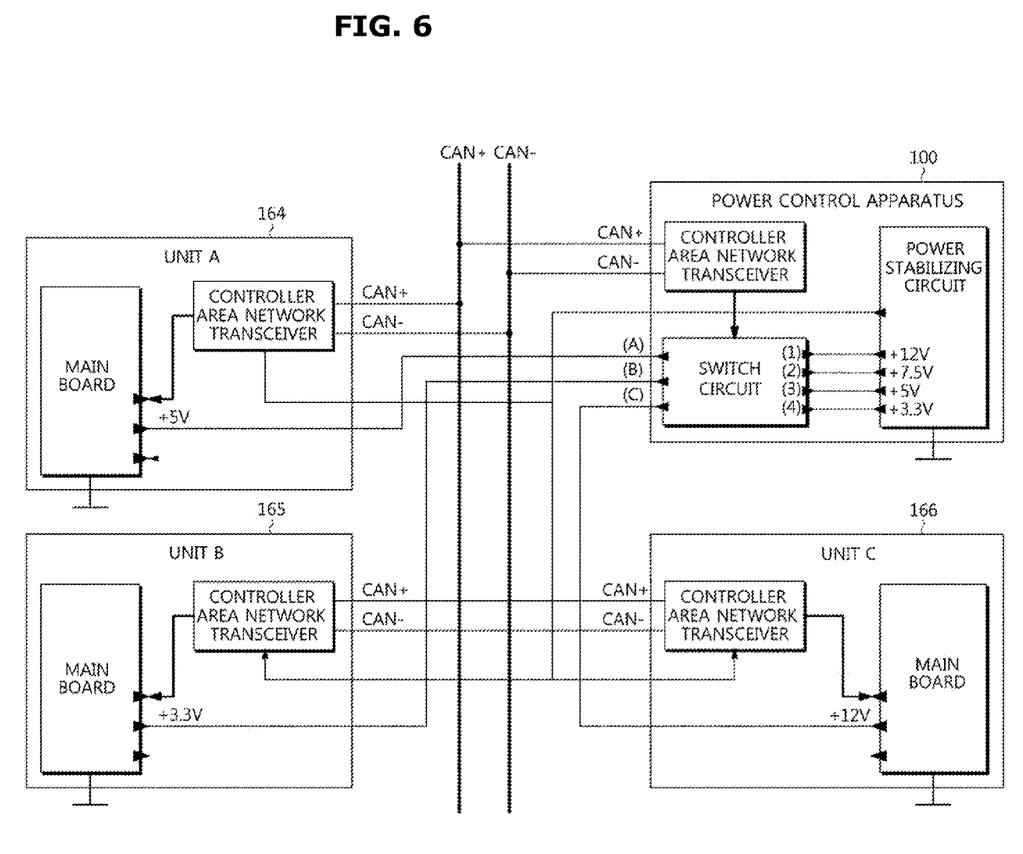
FIG. 6 is a view more specifically illustrating a screen on which the power control apparatus according to the exemplary embodiment of the present invention controls power of the various devices in the vehicle.

FIG. 6 is a view more specifically illustrating a screen on which the power control apparatus according to the exemplary embodiment of the present invention controls power of the various devices in the vehicle. As shown in FIG. 6, the power control apparatus 100 may include the power stabilizing circuit, a CAN transceiver, and a switching circuit. Although the power stabilizing circuit is not shown in the drawings, the power stabilizing circuit may include a circuit configured to remove electromagnetic wave interference and noise, and a regulator integrated circuit (Regulator IC) configured to regulate power supplied from a power supply in the vehicle.

Meanwhile, the circuit configured to remove electromagnetic wave interference and noise may be implemented using at least one among a capacitor, a resistor, an inductive ferrite, and a voltage surge protector. The power control apparatus 100 may be configured to receive the request message related to the power setting from the various devices of the vehicle via the CAN transceiver. Therefore, the power control apparatus 100 may be configured to determine the power condition based on the request message related to the received power condition. According to the determination result, the power control apparatus 100 may be configured to adjust a supply of the power supplied from the power stabilizing circuit to each unit using the switching circuit.

According to the exemplary embodiment of the present invention, the switching circuit may be configured to adjust a supply of power with respect to unit by receiving the power converted to correspond to the power condition through the power stabilizing circuit. As shown in FIG. 6, the power control apparatus 100 may be configured to supply power of about 5 V to a unit A 164, power of about 3.3 V to a unit B 165, and power of about 12 V to a unit C 166. The unit A 164, the unit B 165, and the unit C 166 refer to devices within the vehicle.

Therefore, since the power control apparatus 100 may be configured to adjust the supply of power to the units in the vehicle having ratings different from each other, it is not necessary that the units in the vehicle separately include the power stabilizing circuits. Therefore, development costs and material costs of the devices in the vehicle may be reduced, and time for various reliability tests and quality improvement may be remarkably reduced.

Figure 7A:
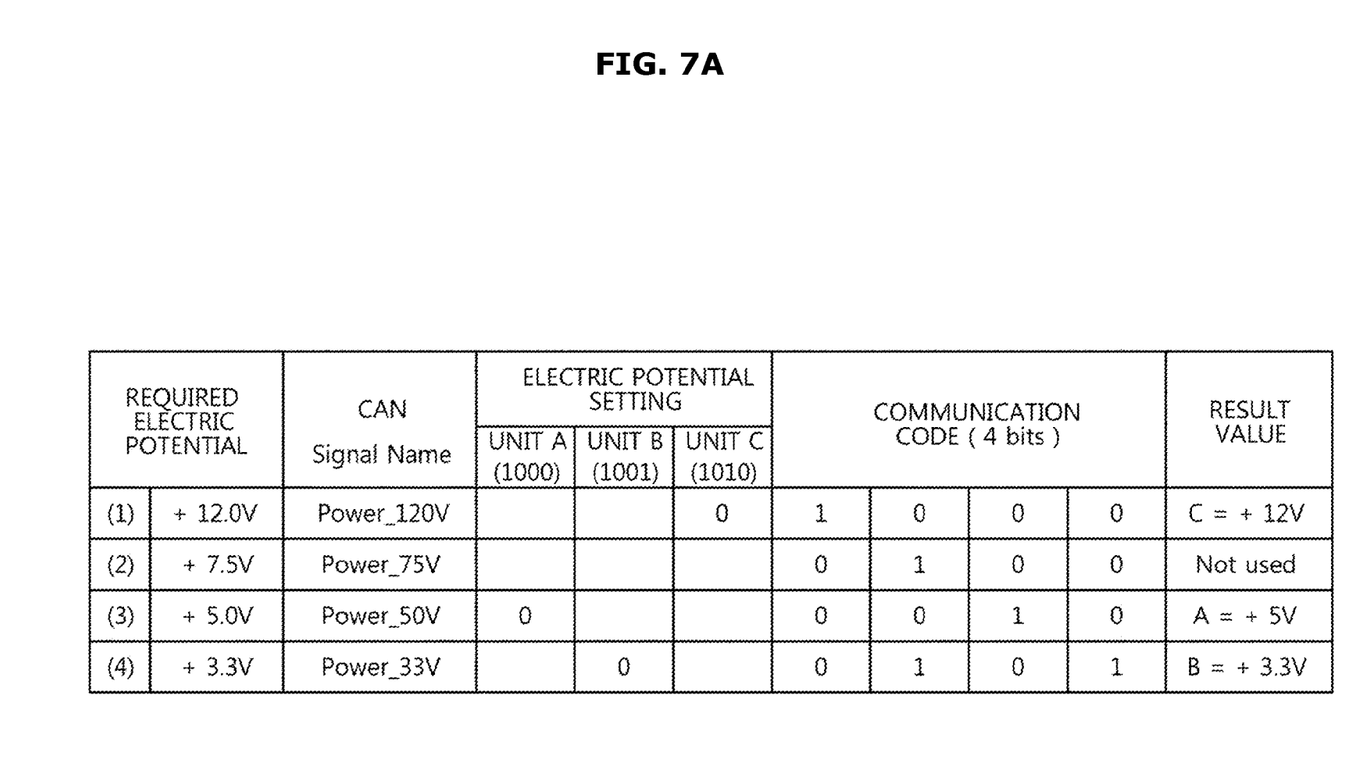
FIGS. 7A-7B are views illustrating a table of a result of setting the power of the devices in the vehicle in accordance with a communication code included in a request message related to the power setting according to the exemplary embodiment of the present invention.
Figure 7B:
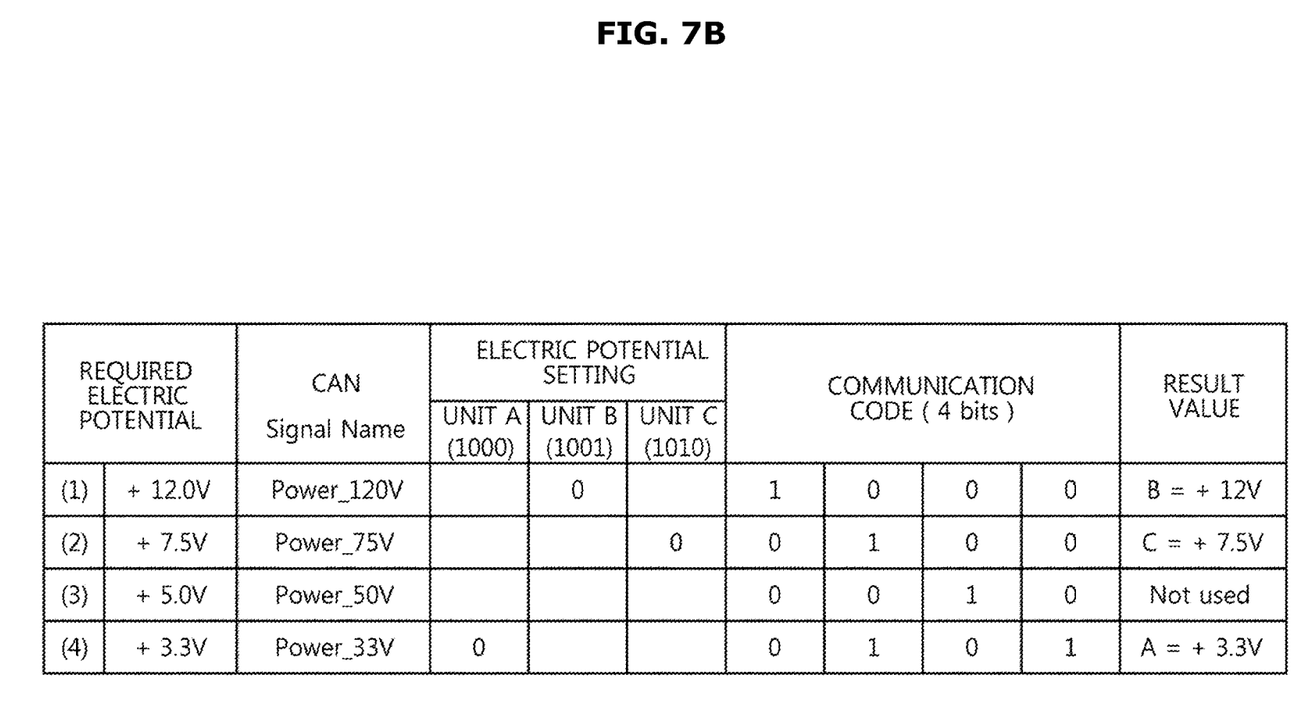

Hereafter, the communication code, which is a determination criterion of the power condition, will be described in detail. FIGS. 7A-7B are views illustrating a table of a result of setting the power of the devices within the vehicle based on a communication code included in a request message related to the power setting according to the exemplary embodiment of the present invention.

The units or devices within the vehicle may be configured to transmit the request message related to the power setting including the identification code and the communication code to the power control apparatus via the network in the vehicle. The power control apparatus may then be configured to distinguish which device transmits the message using the identification code included in the request message related to the power setting. The identification code may be denoted in P (P≥1) bits. For example, the identification code may be denoted in 4 bits. Referring to FIGS. 7A-7B, the identification code of the unit A may be set to '1000', the identification code of the unit B may be set to '1001', and the identification code of the unit C may be set to '1010'.

Meanwhile, the power control apparatus may be configured to determine the power condition using the communication code included in the request message related to the power setting. The communication code may be denoted in M (M≥1) bits. For example, referring to FIGS. 7A-7B, the communication code may be denoted in 4 bits. Specifically, '1000' may correspond to about 12.0 V, '0100' may correspond to about 7.5 V, '0010' may correspond to about 5 V, and '0101' may correspond to about 3.3 V.

According to the exemplary embodiment of the present invention, referring to FIG. 7A, when a request message including the identification code '1010' and the communication code '1000' is received, the power control apparatus may be configured to supply power of about 12 V to the unit C. Additionally, when a request message including the identification code '1000' and the communication code '0010' is received, the power control apparatus may be configured to supply power of about 5 V to the unit A. When a request message including the identification code '1001' and the communication code '0101' is received, the power control apparatus may be configured to supply power of about 3.3 V to the unit B.

Since the power condition according to the communication code may be preset, and the power condition may be stored in the memory in the vehicle. The power control apparatus may be configured to determine the power condition that corresponds to the communication code by comparing the communication code included in the request message with the date stored in the memory. Although the communication codes are the same, the power conditions that correspond to the communication codes may be different. For example, although the communication code is '1000', the electric potential that corresponds to the communication code may be about 12 V or 5 V based on a user setting. Meanwhile, the number of bits of the communication code may be set to correspond to the number of the device installed within the vehicle, but is not limited thereto.

Figure 8A:
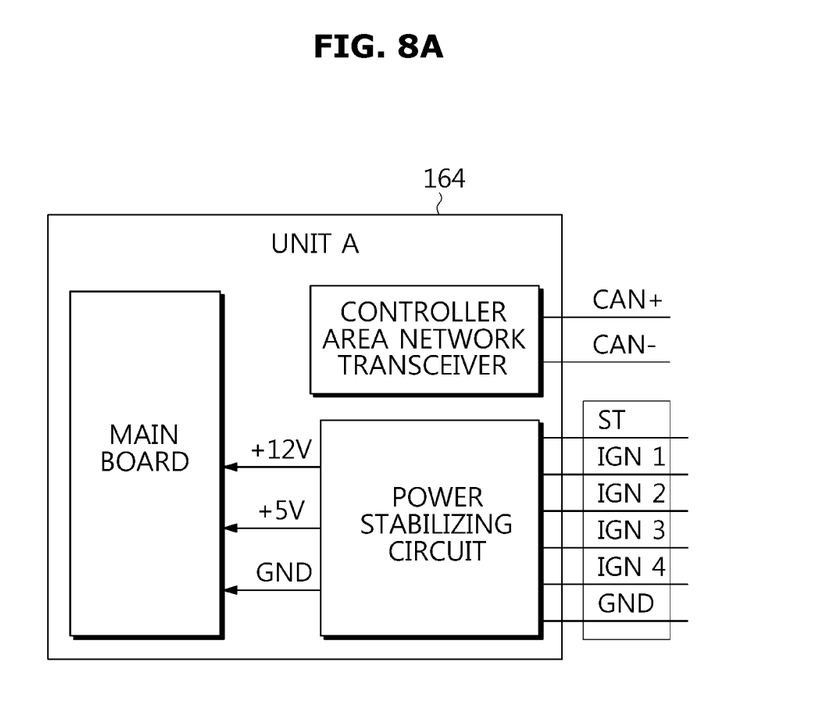
FIGS. 8A-8B are views illustrating a comparison between a case where power stabilizing circuits are installed within the devices in the vehicle according to the exemplary embodiment of the present invention and a case where customized power is supplied to the devices in the vehicle using the power control apparatus.
Figure 8B:
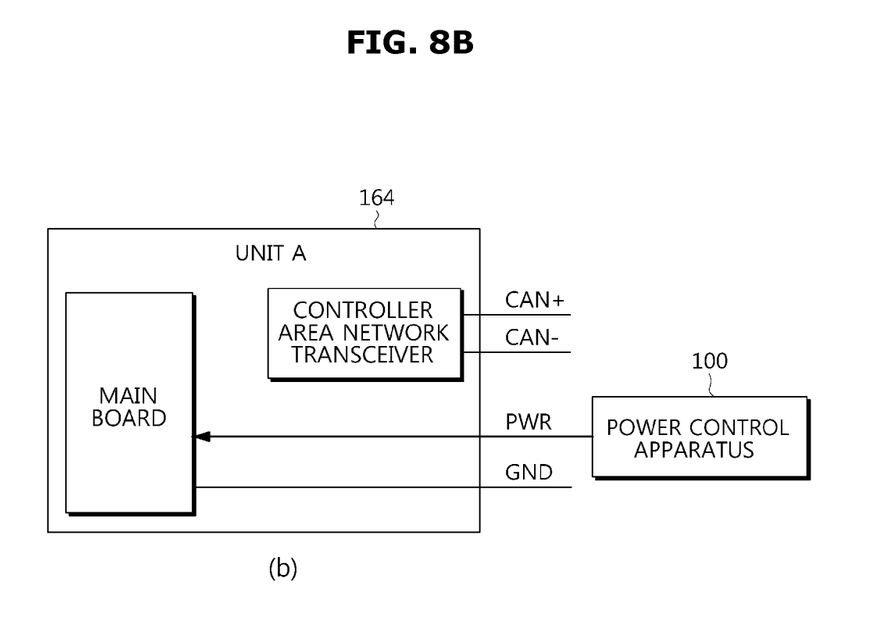

FIGS. 8A-8B are views illustrating a comparison between a case where power stabilizing circuits are installed in the devices within the vehicle according to the exemplary embodiment of the present invention and a case where customized power is supplied to the devices within the vehicle using the power control apparatus. Referring to FIG. 8A, the devices in the vehicle such as the unit A 164 have to regulate received power to be appropriate for the devices using power stabilizing circuits provided in each device to supply the power. Therefore, there is a disadvantage of increasing design costs and material costs for implementing the devices within the vehicle and increasing design time at the same time. Referring to FIG. 8B, the power control apparatus 100, by integrating the supply power stabilizing circuits, may be configured to supply power appropriate for each device in the vehicle after stabilizing power supplied from at least one among the battery and the alternator power supply. Therefore, the power control apparatus 100 may be configured to provide a customized power supply service appropriate for each device in the vehicle.

In addition, referring to FIG. 8A, the unit A 164 may be connected with 6 wires receiving power. However, referring to FIG. 8B, the unit A 164 may be connected with the power control apparatus 100 using 2 lines to receive power. Therefore, 4 lines are reduced through the power control apparatus 100, and thus, the housing size of the unit A 164 and the number of pins of the unit A 164 may be reduced. Therefore, connector material costs of the unit A 164 may be reduced. For example, when N-devices are in the vehicle, the power stabilizing circuits of the devices in the vehicle may be reduced and integrated through a power stabilizing apparatus, thereby providing an effect of reducing material costs such as an Equation 1.

material saving costs of power stabilizing circuit=material costs of power stabilizing circuit×N−material costs for power stabilizing apparatus    Equation 1

In other words, as the number of devices in the vehicle increases, the material costs may be reduced. Additionally, even though devices are added in the vehicle, the power control apparatus may be configured to supply power appropriate for any additional devices by standardizing and sharing the power stabilizing circuits of the devices in the vehicle.

Figure 9:
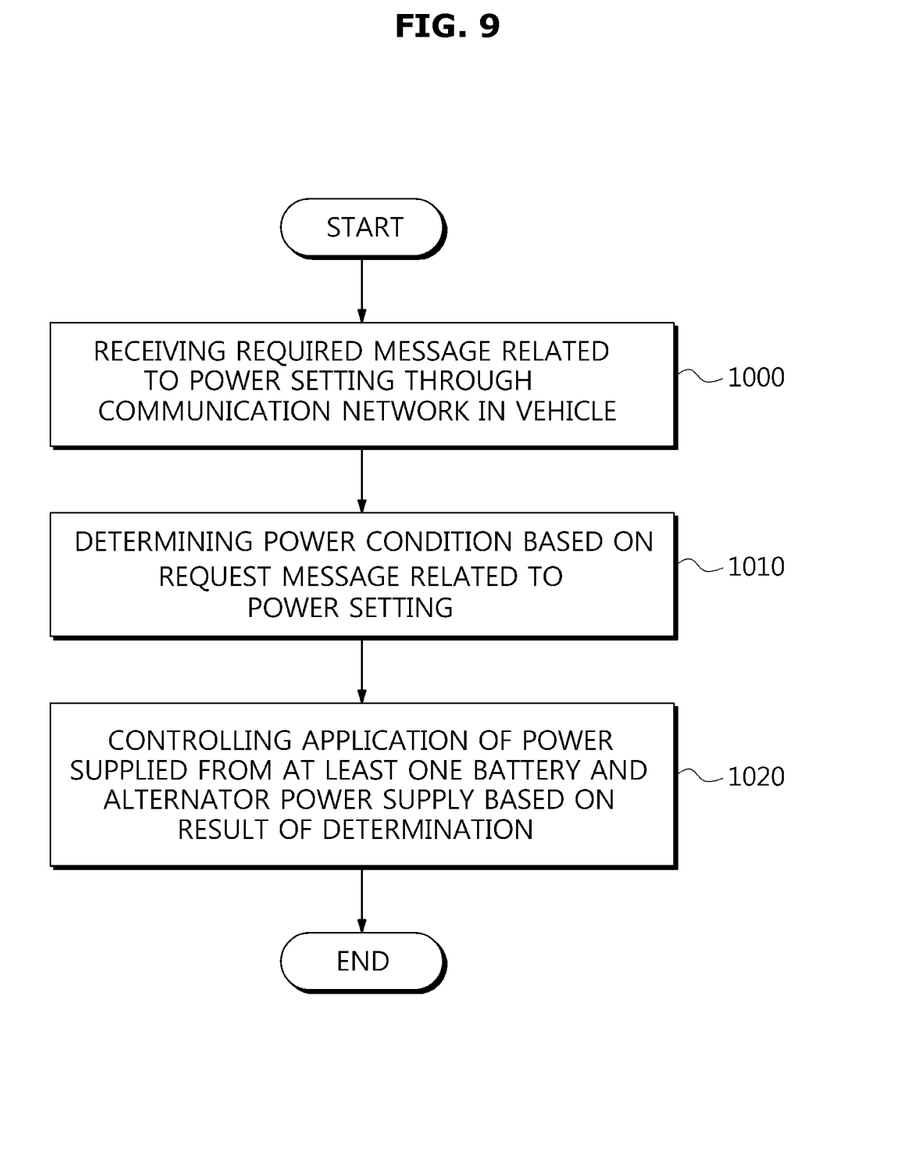
FIG. 9 is a view illustrating a method of controlling the vehicle to supply power appropriate for the various devices installed in the vehicle according to the exemplary embodiment of the present invention.

FIG. 9 is a view illustrating a method of controlling the vehicle to supply power appropriate for the various devices installed within the vehicle. The vehicle may be configured to receive a request message related to a power setting via the communication network in the vehicle (S1000). For example, the vehicle may be configured to receive the request message related to the power setting from a device that desires power supply via the CAN.

The vehicle may further be configured to determine a power condition using a communication code included in the request message related to the power setting (S1010). The power conditions of the devices in the vehicle may be different or the same. Therefore, the vehicle may be configured to supply power appropriate for the devices with respect to the device that desires power supply based on the power condition determined using the communication code. The vehicle may also be configured to convert the power supplied from at least one among the battery and the alternator power supply to be appropriate for the devices, and execute an application of the converted power to the devices (S1020).

According to the exemplary embodiment of the present invention, the vehicle may be configured to stabilize power supplied from at least one the battery and the alternator power supply using the power stabilizing circuit and may be configured to perform a regulating process to convert the power to a working voltage that the devices require at the same time. The vehicle may be configured to apply the regulated power to the devices within the vehicle via the switching circuit. Therefore, since each of the devices of the vehicle performs a regulating process on the power directly received from at least one among the battery and the alternator power supply, a disadvantage of supplying power to the main board may be overcome.

Meanwhile, the battery and the alternator power supply may be connected with each other in parallel, and thus, the power may be supplied to the vehicle even when the battery is discharged or the alternator power supply is blocked. In addition, when the battery is discharged, the battery and the alternator power supply are connected with each other in parallel, alternator power supply may supply power to the vehicle and charge the battery at the same time.

The method according to the exemplary embodiment of the present invention may be implemented in the form of program instructions that may be performed through various computer units and recorded in computer readable media. The computer readable media may include a program instruction, a data file, a data structure, or combinations thereof. The program instructions recorded in the media may be specially designed and configured for embodiments of the present invention, or may be available using well-known instructions for those skilled in the field of computer software. Examples of the computer readable media include magnetic media such as a hard disk, a floppy disk, and a magnetic tape, optical media such as a compact disc read-only memory (CD-ROM) and a digital versatile disc (DVD), magneto-optical media such as a floptical disk, and a hardware device, such as a ROM, a RAM, or a flash memory, that is specially made to store and perform the program instruction. Examples of the program instruction may include a machine code generated by a compiler and a high-level language code that can be executed in a computer using an interpreter. Such a hardware device may be configured as at least one software module in order to perform operations of the invention and vice versa.

As described above, while the exemplary embodiments have been described with reference to specific exemplary embodiments and drawings, various modifications and alterations may be made by those skilled in the art from the above description. For example, when the described technologies are performed in orders different from the described methods, and/or the described components such as a system, a structure, a device, and a circuit are coupled or combined in the form different from the described method, or replaced or substituted with other components or equivalents, the appropriate result may be achieved. Therefore, other implementations, other embodiments and equivalents within the scope of the appended claims are included in the range of the claims to be described.

What is claimed is:

1. A power control apparatus, comprising:
 a communication unit configured to receive a request message related to a power setting from each of a plurality of devices having the same or different power conditions via a communication network in a vehicle;
 a determination unit configured to determine a power condition based on the request message related to the power setting; and
 an application controller configured to execute an application of power supplied from at least one of a battery and an alternator power supply based on a result of the determination,
 wherein the application controller includes a power stabilizer circuit which converts a voltage of the power supplied from at least one of the battery and the alternator power supply into a working voltage required for each of the plurality of devices.

2. The power control apparatus of claim 1, wherein the communication unit is configured to receive the request message related to the power setting from at least one device in the vehicle via a controller area network (CAN).

3. The power control apparatus of claim 1, wherein the determination unit is configured to determine the power condition using a communication code included in the request message related to the power setting.

4. The power control apparatus of claim 1, wherein the determination unit is configured to determine whether the power condition corresponds to at least one power condition among Ignition 1 (IGN1), Ignition 2 (IGN2), Accessory (ACC), Start (ST), B+, and off (OFF) using a communication code included in the request message related to the power setting.

5. The power control apparatus of claim 1, wherein the application controller is configured to regulate the power supplied from the battery and the alternator power supply into power that corresponds to at least one power condition among Ignition 1 (IGN1), Ignition 2 (IGN2), Accessory (ACC), Start (ST), B+, and off (OFF) and apply the regulated power based on the result of the determination.

6. The power control apparatus of claim 1, wherein the application controller, when the power condition is determined to be changed, is configured to execute the application of the power to power that corresponds to the changed power condition in response to the application of power based on the result of the determination.

7. A vehicle, comprising:
a communication unit configured to receive a request message related to a power setting from each of a plurality of devices having the same or different power conditions via a communication network in the vehicle;
a determination unit configured to determine a power condition based on the request message related to the power setting; and
an application controller configured to execute an application of power supplied from at least one among a battery and an alternator power supply based on a result of the determination,
wherein the application controller includes a power stabilizing circuit which converts a voltage of the power supplied from at least one of the battery and the alternator power supply into a working voltage required for each of the plurality of devices.

8. The vehicle of claim 7, wherein the communication unit is configured to receive the request message related to the power setting from at least one device within the vehicle via a controller area network (CAN).

9. The vehicle of claim 7, wherein the determination unit is configured to determine the power condition using a communication code included in the request message related to the power setting.

10. The vehicle of claim 7, wherein the determination unit is configured to determine whether the power condition corresponds to at least one power condition among Ignition 1 (IGN1), Ignition 2 (IGN2), Accessory (ACC), Start (ST), B+, and off (OFF) using a communication code included in the request message related to the power setting.

11. The vehicle of claim 7, wherein the application controller is configured to regulate the power, supplied from the battery and the alternator power supply, into power that corresponds to at least one among Ignition 1 (IGN1), Ignition 2 (IGN2), Accessory (ACC), Start (ST), B+, and off (OFF) and apply the regulated power based on the result of the determination.

12. The vehicle of claim 7, wherein the application controller is configured to, when the power condition is determined to be changed, execute the application of the power to power that corresponds to the changed power condition in response to the application of power based on the result of the determination.

13. A method of controlling a vehicle, comprising:
receiving, by a controller, a request message related to a power setting from each of a plurality of devices having the same or different power conditions via a communication network in the vehicle;
determining, by the controller, a power condition based on the request message related to the power setting;
executing, by the controller, an application of power supplied from at least one of a battery and an alternator power supply based on a result of the determination; and
converting, by the controller, a voltage of the power supplied from at least one of the battery and the alternator power supply into a working voltage required for each of the plurality of devices.

14. The method of claim 13, further comprising:
receiving, by the controller, the request message related to the power setting from at least one device in the vehicle via a controller area network (CAN).

15. The method of claim 13, further comprising:
determining, by the controller, the power condition using a communication code included in the request message related to the power setting.

16. The method of claim 13, further comprising:
determining, by the controller, whether the power condition corresponds to at least one power condition among Ignition 1 (IGN1), Ignition 2 (IGN2), Accessory (ACC), Start (ST), B+, and off (OFF) using a communication code included in the request message related to the power setting.

17. The method of claim 13, further comprising:
regulating, by the controller, the power, supplied from the battery and the alternator power supply into power that corresponds to at least one among Ignition 1 (IGN1), Ignition 2 (IGN2), Accessory (ACC), Start (ST), B+, and off (OFF); and
applying, by the controller, the regulated power based on the result of the determination.

18. The method of claim 13, further comprising:
executing, by the controller, an application of the power to power that corresponds to the changed power condition in response to the application of power based on the result of the determination when the power condition is determined to be changed.

* * * * *